(12) United States Patent
Jin et al.

(10) Patent No.: US 7,384,556 B2
(45) Date of Patent: Jun. 10, 2008

(54) METHODS OF ENHANCING BIODEGRADATION OF GROUNDWATER CONTAMINANTS

(75) Inventors: Song Jin, Laramie, WY (US); Paul H. Fallgren, Laramie, WY (US)

(73) Assignee: The University of Wyoming Research Corporation, Laramie, WY (US)

( * ) Notice: Subject to any disclaimer, the term of this patent is extended or adjusted under 35 U.S.C. 154(b) by 113 days.

(21) Appl. No.: 11/489,921

(22) Filed: Jul. 19, 2006

(65) Prior Publication Data
US 2007/0017866 A1    Jan. 25, 2007

Related U.S. Application Data

(60) Provisional application No. 60/700,837, filed on Jul. 19, 2005.

(51) Int. Cl.
*C02F 3/00* (2006.01)
(52) U.S. Cl. .................. 210/610; 210/611; 210/739
(58) Field of Classification Search ........ 210/610–611, 210/739
See application file for complete search history.

(56) References Cited

U.S. PATENT DOCUMENTS

| | | | |
|---|---|---|---|
| 6,776,816 | B1 | 8/2004 | Ringelberg et al. |
| 2002/0184655 | A1 | 12/2002 | Lubon et al. |
| 2004/0050764 | A1 | 3/2004 | Perriello |
| 2006/0094106 | A1* | 5/2006 | Priester et al. ............. 435/244 |
| 2006/0226068 | A1* | 10/2006 | Hill et al. .................. 210/610 |

OTHER PUBLICATIONS

Adegbidi, H.G. et al.. 2003. Effect of organic amendments and slow-release nitrogen fertilizer on willow biomass production and soil chemical characteristics. Biomass Bioenergy. 25:389-398.
Adoki, A. et al. 1999. Effects of amendments on biodegradation crude petroleum by sediment bacteria from the Bonny River Estuary. Afr. J. Ecol. 37:258-266.
Al-Bashir, B.,T. et al. 1990. Effect of soil/contaminant interactions on biodegradation of naphthalene in flooded soil under denitrifying conditions. Appl. Microbiol. Biotechnol. 34:414-419.
Atlas, R.M. 1991. Microbial hydrocarbon degradation—bioremediation of oil spills. J. Chem. Tech. Biotechnol. 52:149-156.
Bagley D.M. et al. 1990. Tetrachloroethene transformation to trichloroehene and cis-1,2-dichloroethene by sulfate reducing enrichment culture. Appl. Environ. Microbiol. 56: 2511-2516.

(Continued)

*Primary Examiner*—Chester T Barry
(74) *Attorney, Agent, or Firm*—Santangelo Law Offices, P.C.

(57) ABSTRACT

Systems and methods for co-enhancing contaminant degradation such as LNAPL and DNAPL degradation. Embodiments of the inventive technology may relate to assuring adequate amounts (e.g., concentrations) of certain substances (e.g., nitrogen, electron acceptor, bacteria, microbial substrate) so that degradation of LNAPL and DNAPL is enhanced as intended. Any of the inventive methods may involve the amendment of groundwater with one or more particular substance (uric acid, electron acceptors, microbial substrate, as but a few examples) in order to enhance DNAPL, and perhaps also, LNAPL degradation.

31 Claims, 9 Drawing Sheets

OTHER PUBLICATIONS

Boopathy, R. et al. 2001. Enhanced biotransformation of trichloroethylene under mixed electron acceptor conditions. Current Microbiology. 42:134-138.

Bouwer E.J. et al. 1983. Transformation of 1- and 2 carbon halogenated aliphatic organic compounds under methanogenic conditions. Appl. Environ. Microbiol. 45: 1286-1294.

Bregnard, T.P. et al. 1998. Bioavailability and biodegradation of weathered diesel fuel in aquifer material under denitrifying conditions. Environ. Toxicol. Chem. 17:1222-1229.

Brook, T.R. et al. 2001. Biodegradation of diesel fuel in soil under various nitrogen addition regimes. Soil Sediment Contam. 10(5):539-553.

Brookhaven National Laboratory; Coal-eating Bacteria May Improve Methane Recovery; 1 page; http://www.sciencedaily.com/releases/2003/09/030912073359.htm , 2003.

Canfield, D. et al. 1993. The anaerobic degradation of organic matter in Danish coastal sediments: Fe reduction, Mn reduction, and sulfate reduction. Geochim. Cosmochim. Acta. 57:3867-3883.

Christiansen, L.C. et al. 1997. Xanthine metabolism in *Bacillus subtilis*: characterization of the *xpt-pbuX* operon and evidence for purine- and nitrogen-controlled expression of genes involved in xanthine salvage and catabolism. J. Bacteriol. 179:2540-2550.

Coates, J.D. el at. 1997. Anaerobic degradation of polycyclic aromatic hydrocarbons and alkanes in petroleum-contaminated marine harbor sediments. Appl. Environ. Microbiol. 63:3589-3593.

De Bruin, W.P.et al. 1992. Complete biological reductive transformation of tetrachloroethene to ethane. Appl. Environ. Microbiol. 11: 1996-2000.

Drzyzga, O. et al. 2002. Dehalogenation of chlorinated ethenes and immobilization of nickel in anaerobic sediment columns under sulfidogenic conditions.

Durant, N.D. et al. 1995. Microcosm studies of subsurface PAH-degrading bacteria from a former manufactured gas plant. J. Contam. Hydrol. 17:213-237.

Fliermans, C.B. et al. 1988. Mineralization of trichloroethylene by heterotrophic enrichment cultures. Appl Environ. Microbiol. 54: 1709.

Freedman, D.L. et al. 1989. Biological reductive dechlorination of tetrachloroethylene and trichloroethylene to ethylene under methanogenic conditions. Appl. Enviorn. Microbiol. 55: 2144-2151.

Godsy, E.M.et al. 2003. The role of microbial reductive dechlorination of TCE at a phytoremediation site. Int. J. Phytorem. 5:73-87.

Hardman, D.J. 1991. Biotransformation of halogenated compounds. Crit. Rev. in Biotechnol. 11:1-40. 1985, Biotransformation of tetrachloroethylene to trichloroethylene, dichloroethylene, vinyl chloride, and carbon dioxide under methanogenic conditions. Appl. Environ. Microbiol. 49: 1080.

Hoelen, T.P. et al. 2004. Complete biological dehalogenation of chlorinated ethylenes in sulfate containing groundwater. Biodegradation. 15: 395-403.

Holliger, C. et al. 1993. A highly purified enrichment culture couples the reductive dechlorination of tetrachloroethene to growth. *Applied Environmental Microbiology* 59: 2991-2997.

Hunkeler, D. et al. 2002. Engineered and subsequent intrinsic in situ bioremediation of a diesel fuel contaminated aquifer. J. Contam. Hydrol. 59:231-245.

Kent, B.et al. 2001. Remediation of NAPL-contaminated aquifers: is the cure worth the cost? J. Environ. Sci. Health. A36(8):1559-1569.

Koren, O. et al. 2003. Petroleum pollution bioremediation using water-insoluble uric acid as the nitrogen source. Appl. Environ. Microbiol. 69:6337-6339.

Krone, U.E.et al. 1989. Coenzyme F430 as a possible catalyst for the reductive dehalogenation of chlorinated C1 hydrocarbons in methanogenic bacteria. Biochemistry. 28: 10061-10065.

Krumholz, L.R. et al. 1996. A freshwater anaerobe coupling acetate oxidation to tetrachloroethylene dehalogenation. Appl. Enviorn. Microbiol. 62: 4108-4113.

Leahy, J.G. et al. 1990. Microbial degradation of hydrocarbons in the environment. Microbiol. Rev. 54:305-315.

Leduc, R. et al. 1992. Biotic and abiotic disappearance of four PAH compounds from flooded soil under various redox conditions. Water Sci. Technol. 25:51-60.

Lee, M.D. et al. 1997. Scale-up issues for in situ anaerobic tetrachlorethene bioremediation. J. Ind. Microbiol. Biotechnol. 18:106-115.

Maymó-Gatell, X. et al. 1999. Reductive dechlorination of chlorinated ethenes and 1,2-dichloroethane by "*Dehalococcoides ethenogenes*" 195. *Applied Environmental Microbiology* 64:3108-3113.

Mihelcic, J.R. et al. 1988. Microbial degradation of acenapthene and naphthalene under denitrification conditions in soil-water systems. Appl. Environ. Microbiol. 54:1188-1198.

Ndon, U.J. et al. 2000. Reductive dechlorination of tetrachloroethylene by soil sulfate-reducing microbes under various electron donor conditions. Environmental Monitoring and Assessment. 60: 329-336.

Pavlostathis, S.G. et al. 1993. Reductive dechlorination of chloroalkenes in microcosms developed with a field contaminated soil. Chemosphere 27: 585-595.

Piskonen, R. et al. 2002. Evaluation of bioremediation treatments in a shore-line simulating microcosm. Biorem. J. 6(2);143-158.

Reeburgh, W.S. 1983. Rates of biogeochemical processes in anoxic sediments. Annu. Rev. Earth Planet. Sci. 11:269-298.

Rivett, M.O. et al. 2003. A controlled field experiment on groundwater contamination by a multi-component DNAPL: dissolved plume retardation. J. Contam. Hydrol. 66:117-146.

Schultz, A.C. et al. 2001. Functional analysis of 14 genes that constitute the purine catabolic pathway in *Bacillus subtilis* and evidence or a novel regulon controlled by PucR transcription activator. J. Bacteriol. 183:3293-3302.

Sharma P. K. et al. 1996. Isolation and characterization of a facultatively aerobic bacterium that reductively dehalogenates tetrachloroethene to *cis*-dichloroethene. Appl. Environ. Microbiol. 62:761-765.

Shoji, S. et al. 2001. Use of Controlled Release Fertilizers and Nitrification Inhibitors to Increase Nitrogen Use Efficiency and to Conserve Air and Water Quality. Commun. Soil Sci. Plant Anal. 32(7&8), 1051-1070.

Tisdale, S.L. et al. 1985. Soil Fertility and Fertilizers, 4$^{th}$ edition. New York: Macmillan Publishing Company.

U.S. Appl. No. 60/700,837, filed Jul. 19, 2005; 15 pages and 5 drawing pages.

Weller, J.B. et al. 1977. Farm Wastes Management. London: Crosby Lockwood Staples.

\* cited by examiner

METHODS OF ENHANCING BIODEGRADATION OF GROUNDWATER CONTAMINANTS

This non-provisional patent application claims priority to U.S. Provisional patent application No. 60/700,837, filed Jul. 19, 2005, hereby incorporated herein by reference.

BACKGROUND OF THE INVENTION

The present inventive technology, in embodiments, includes enhancing light non-aqueous phase liquid ("LNAPL") degradation to accelerate dense non-aqueous phase liquid ("DNAPL") degradation; and perhaps even amending uric acid and uric acid-containing wastes as nitrogen sources in biodegradation of perhaps both LNAPL and DNAPL.

LNAPLs, including but not limited to gasoline, diesel, motor oil, and the like continue to be common contaminants in soils, groundwater, and the like. Bioremediation is an effective technique used in degrading LNAPL, which are converted into harmless by-products. Aerobic degradation dominates LNAPL remediation. In groundwater where oxygen is depleted, LNAPL can be biodegraded anaerobically by denitrification, iron reduction, and other microbial processes. Higher redox conditions are usually in favor of LNAPL biodegradation.

Dense non-aqueous phase liquids (DNAPLs), including but not limited to trichloroethene ("TCE"), are another type of contaminant found in groundwater and the like. Biologically catalyzed reductive dehalogenation may be a reducing process that reduces DNAPL to their final products. Reductive dehalogenation may occur under lower redox conditions, perhaps where acetogenesis, sulfidogenesis, methanogenesis and the like are dominant.

DNAPL (TCE and PCE, as but two examples) may be a major concern in groundwater contamination. These contaminants may transport rapidly down the vadose zone and end up in the groundwater. DNAPL tend to accumulate in bedrock, sediments or the like because of its high density and low water solubility. DNAPL may act as a source of groundwater contamination and may be recalcitrant to conventional remedial technologies. Reductive dehalogenation may be the most favorable bioremediation method for DNAPL clean-up in groundwater. As in LNAPL degradation, N nutrients may be a factor in shortage. However, conventional nitrogen amendments may have a very low efficiency for DNAPL degradation, possibly due to the high solubility of these amendments and the low solubility of DNAPL or for other reasons. This incompatibility may warrant a nitrogen source with relative DNAPL-affinity and time-releasing characteristics.

Enhanced bioremediation may overcome factors that may limit the rates of conventional pollutant biodegradation. Pollutant biodegradation may involve using enzymatic capabilities of indigenous microbes and perhaps modifying environmental factors such as oxygen, nitrogen, phosphorus, sulfur and electron acceptors concentration, as but a few examples. Nitrogenous ("N") nutrients, such as ammonium nitrate, ammonium sulfate, urea, ammonium chloride, sodium nitrate, and the like have been studied and may have been shown under various conditions to stimulate microbial activities and degradation rates in soil and groundwater systems. Ammonium ($NH_4^+$), as may be a preferred N nutrient released by these source compounds, may be readily consumed by aerobic microbes for amino acid formation and other metabolisms. Nitrate ($NO_3^-$) may be a preferred N nutrient, as well as an electron acceptor, for anaerobic microbes to degrade hydrocarbons via denitrification.

Some nitrogen amendments may be highly soluble in water and large amounts of N nutrients may be released in short periods of time. Highly soluble N nutrients may not be available to groundwater microbes of low populations. In addition, $NO_3^-$ may be lost due to denitrification and chemical decomposition. Frequent reapplications of these quick-releasing nitrogen fertilizers could be necessary to maintain the satisfactory biodegradation of contaminants, which could drive up the operational cost.

A slow-releasing N fertilizer should have one or more chemical or perhaps metabolic pathways and should be relatively insoluble in water. Urea may be considered as a slow-releasing N fertilizer since it may undergo hydrolysis before ammonium can be released. However, urea may be highly water-soluble and may even be subject to leaching through soil and dilution in groundwater. There may be slow-releasing N fertilizers, such as sulfur coated or polyolefin coated urea and the like, that may be relatively insoluble and may release N much more slowly than urea does. Yet, they may be energy intensive to produce, possibly making them an undesirable alternative due the high cost.

As such, highly soluble nitrogen compounds may be less bioavailable for microorganisms that are responsible for reductive dehalogenation, possibly resulting in expensive and low efficiency biodegradation. Although the role of nitrogen in biodegradation of LNAPL may be well recognized, and it may be equally critical in the bioremediation of DNAPL compounds.

DNAPL, such as the chlorinated solvent TCE, is a group of common contaminants in soil and groundwater. DNAPL transport rapidly down the vadose zone into the groundwater, and accumulate in bedrock or sediments due to their high mass density and low water solubility. DNAPL is a group of groundwater contamination that is recalcitrant to conventional remedial technologies. Under anaerobic conditions, such as in oxygen-depleted groundwater, TCE can be reductively dechlorinated by pure or mixed bacterial populations to less chlorinated ethenes and eventually to ethane (Holliger et al, 1993; Krumholz et al., 1996; Sharma and McCarty, 1996; Maymo-Gateil et al., 1997). Reductive dechlorination has been widely applied as an effective technique in cleaning up chlorinated solvents. This technology resolves the difficulty of inaccessibility to contaminants, as in other mechanical and physical remedies. Biodechlorination of chlorinated ethenes have been studied under various anaerobic conditions (nitrate reducing, sulfate reducing, iron reducing, and methanogenic processes) conditions (Bagley and Gossett 1990; Boopathy and Peters 2001; Bouwer and McCartey 1983; DeBruin et al. 1992; Flierman et al. 1988; Freedman and Gossett 1989; Hardman 1991; Hoelen and Reinhard 2004; Krone et al. 1989; Ndon et al. 2000). In some studies, dechlorination has been reported to cease at cis-1,2-dichlorethene (cis-DCE) and vinyl chloride (VC) in the presence of sulfate (Bagley and Gossett 1990; Boopathy and Peters 2001; Ndon et al. 2000). Complete dechlorination of TCE to ethene has been reported under methanogenic conditions (Bouwer and McCartey 1983; De Bruin et al. 1992). In other laboratory and field studies, dechlorination of PCE and TCE was observed occurring under or associated with sulfate reducing conditions (Bagley and Gossett, 1990; DiStefano et al., 1991; Pavlostathis and Zhuang, 1993; Maymó-Gatell et al., 1999; Ndon, et al., 2000; Drzyzga et al., 2002; Hoelen and Reinhard, 2004).

LNAPL, such as diesel and motor oil, are usually co-existing with DNAPL like TCE, although not necessarily in the same groundwater zone. In the site under study, free and soluble phases of LNAPL and DNAPL have formed a "four phase" system in the groundwater. Since the favorable degradation conditions for LNAPL are either in the presence of oxygen or other "higher-redox" electron acceptors, such as nitrate, the redox conditions sustaining reductive dehalogenation of DNAPL are not supportive to LNAPL degradation.

Fuel hydrocarbons are a group of co-contaminants frequently co-existing with chlorinated ethenes. Under proper conditions, capable microbes utilize fuel hydrocarbons as the carbon source for their metabolisms, converting them into shorter-chained intermediates and/or final products of carbon dioxide. When oxygen is depleted, as in most groundwater systems, nitrate reduction has been reported to be the most favorable pathway for hydrocarbon degradation (Al-Bashir et al. 1990; Durant et al. 1995; Leduc et al. 1992; Mihelcic and Luthy 1988). Typically, biodegradation of hydrocarbons depletes both oxygen and nitrate, leading to sulfate-reducing conditions (Hoelen and Reinhard 2004). Some studies have reported efficient biodegradation under sulfate-reducing conditions (Canfield et al. 1993; Coates et al. 1997; Reeburgh 1983). Consumption of the fuel hydrocarbons by sulfate reducers can channel protons/electrons to dehalogenating bacteria (e.g., dechlorinating bacteria), and, at least in the case of degradation of TCE, reductive dechlorination may be completed without accumulating cis-DCE and VC.

Further shortcomings of conventional technologies relative to bioremediation include the absence of methods that efficiently address the problem of co-contamination, i.e., the case where groundwater is contaminated with LNAPL and DNAPL, perhaps in different zones. At least one embodiment of the inventive technology provides a method whereby the contaminated groundwater is measured relative to concentrations (molar ratio, population per volume, as but two examples) of certain substances (living and non-living things, such as nitrogen, phosphorus, electron acceptor and/or bacteria, as but a few examples), and such measurements can be used to determine whether an amendment (e.g., an addition of a certain substance, whether living or non-living) should be added to enhance degradation of both LNAPL and DNAPL contaminants.

SUMMARY OF THE INVENTION

It is an object of certain embodiments of the present inventive technology to provide an enhanced biodegradation of contaminants, perhaps even petroleum contaminants (a type of LNAPL) and/or DNAPL contaminants.

It is an object of certain embodiments of the present inventive technology to provide a slow-releasing and perhaps even a relatively insoluble fertilizer to treat contaminants, including DNAPL.

It is an object of certain embodiments of the present inventive technology to treat LNAPLs and DNAPLs sequentially using by-products and biogeochemical shifts from LNAPL degradation to accelerate DNAPL degradation.

It is an object of certain embodiments of the present inventive technology to provide a method by which it can be determined if co-contaminated groundwater (e.g., LNAPL and DNAPL contaminated) can be amended to make it more amenable to biodegradation. Indeed, a more efficient (e.g., faster and/or more complete) biodegradation of LNAPL and/or DNAPL may result where it is found that one or more of a certain index (e.g., the bacterial population, or the molar amount of electron acceptor, as but two examples) is not in that range that yields enhanced biodegradation, and an amendment(s) is made to the groundwater (e.g., an addition of bacteria or electron acceptor) in order to bring such index(-ices) into that ideal biodegradation range.

It is an object of certain embodiments of the present inventive technology to utilize animal solid wastes, which may be thought of as environmental pollutants, to help treat petroleum contaminants.

It is an object of certain embodiments of the present inventive technology to utilize uric acid and uric acid-containing materials (including waste materials) in the degradation of contaminants such as LNAPL and DNAPL.

Naturally, further objects, goals and embodiments of the inventions are disclosed throughout other areas of the specification.

DETAILED DESCRIPTION OF THE PREFERRED EMBODIMENTS

Figure 1:
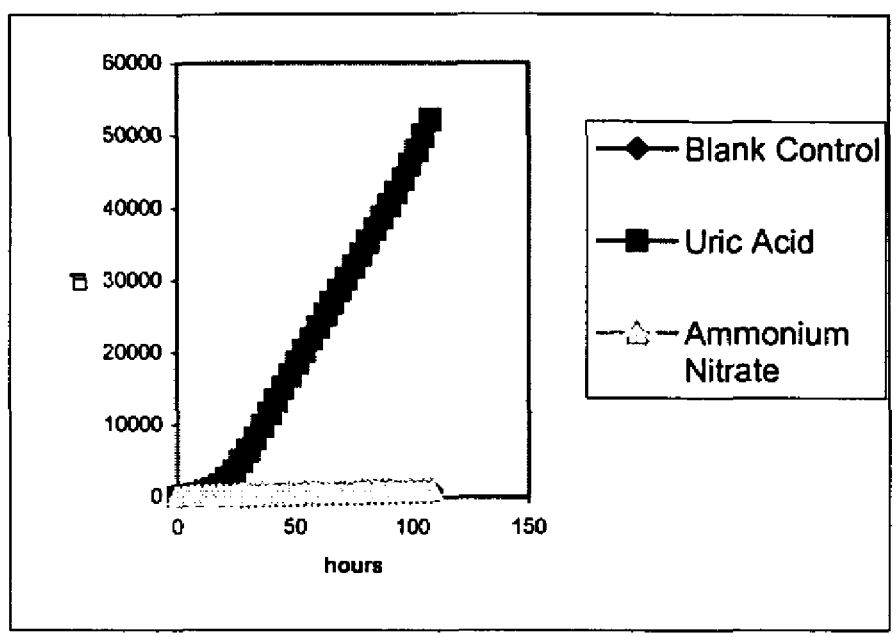
FIG. 1 shows results from an example of a $CO_2$ accumulation (as microbial respiration) in an uric acid study in accordance with embodiments of the present inventive technology (see also Study Set 1).

The present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

"Higher-redox" reactions (e.g., denitrification, iron reduction and the like) may degrade LNAPLs into smaller organic compounds (including but not limited to fatty acids) and final products (e.g., $CO_2$, $H_2O$ and the like). This pathway may consume electron acceptors at higher redox potential, and may shift the system towards more reduced, lower redox conditions, under which reductive dehalogenation of DNAPLs may occur (perhaps through methanogenesis, acetogenesis or sulfidogenesis (as but three examples) biologically catalyzed by bacteria). Indeed, as the aquifer's redox potential decreases as electron acceptors are consumed (e.g., during LNAPL degradation), the preferred bacterial pathway for contaminant degradation is denitrification, metal reduction (e.g., reduction of iron or manganese), and sulfur reduction; as the redox potential decreases, the system's ability to degrade LNAPL decreases and its ability to degrade DNAPL increases.

It is of note that small organic compounds from LNAPL degradation may serve as substrates (an energy source, perhaps viewed as a type of "food") for the bacteria and perhaps even as sources of hydrogen, which itself may yield electrons and protons that also serve as substrate, perhaps sustaining reductive dehalogenation of DNAPLs and other "low-redox" pathways such as sulfidogenesis and methanogenesis. For example, in a groundwater contaminated by both LNAPL and DNAPL constituents, nitrogen nutrients can be added to reach the C:N balance and may enhance LNAPL biodegradation. At the same time, nitrogen amendments may eventually feed the process of DNAPL degradation.

Uric acid ($C_5H_4N_4O_3$) may be a nitrogen-rich component in wastes from birds (including poultry), reptiles, many insects and the like. As used herein, uric acid includes even those materials that have uric acid therein (in addition to having other substances therein) such as poultry manure. Uric acid has a cyclic structure and its solubility in water may be low. Many different species of hydrocarbon-degrading bacteria may be able to utilize uric acid as a nitrogen source (e.g., a nutrient nitrogen source). Uric acid may require more than one microbial metabolic pathway to release N in the form of $NH_4^+$. Uric acid may undergo hydrolysis and oxidation steps before releasing N, then it may eventually form into urea. Furthermore, urea may undergo one more step to release its N. These characteristics may make uric acid a potential slow-releasing N source. Uric acid may have also been determined to have chemical affinities to petroleum hydrocarbons in soils, groundwater, and the like. Therefore, uric acid could provide a slow-releasing nitrogen source for bacteria (thus, a slow releasing nutrient nitrogen source) growing at a hydrocarbon-water interface. Uric acid may be an effective and efficient nitrogen source for DNAPL degradation pathways because of its slow release, and its affinity (e.g., structural) for DNAPL.

Another feature of uric acid may be its special affinity to hydrocarbon and/or DNAPL contaminants. This affinity may serve as an enriching trap for capable microorganisms, which may mobilize toward rich carbon-nitrogen locations.

Yet another function of uric acid may be to serve as a nitrate reservoir as well as an ammonium source. Nitrate may be the electron acceptor for denitrification, which may be an effective process for LNAPL and DNAPL biodegradation under anaerobic conditions.

Many, if not all, of the aforementioned features may be viewed as desirable for both LNAPL and DNAPL biodegradations. The use of uric acid and uric acid-containing materials, such as but not limited to composted poultry manure, in agriculture may have resulted in increased biomass. Uric acid may be found in concentrations of 2.94% in poultry manure, often abundantly produced. Major poultry industries can produce up to 48 metric tons of manure per week and it may be relatively inexpensive, perhaps making it a desirable source of uric acid. Of course, other sources of uric acid are available; all are meant to be included in this disclosure.

Certain aspects of the present inventive technology, in embodiments, may provide use of enhanced "higher redox" biodegradation of LNAPL through the use of uric acid and/or other amendments, to provide small molecular organic compounds and decrease redox potential, thereby enhancing DNAPL degradation in soils and groundwater.

In particular embodiments, the present inventive technology may provide use of uric acid and uric acid-containing wastes and their derivative compounds, which may be produced biologically or chemically, as a hydrocarbon-affinitive nitrogen source to enhance bioremediation of LNAPL and/or DNAPL in the soil and groundwater.

At least one embodiment of a groundwater contaminant degradation method may comprise the steps of: identifying an aquifer with DNAPL contamination (e.g., simply by locating it); perhaps locating a zone of groundwater contaminated with DNAPL in the aquifer (e.g., by estimating the location of a DNAPL plume); amending the aquifer with uric acid (perhaps in the form of poultry manure, a broad term including any substance with poultry wastes therein); and biodegrading the DNAPL (e.g., by simply waiting for the bacteria to process contaminant). It is of note that the aquifer may also be LNAPL contaminated. It is also of note that uric acid may be added to the aquifer until a molar ratio of carbon to nutrient nitrogen in LNAPL and DNAPL-contaminated groundwater is no greater than 16 (or perhaps no greater than 110:15, or perhaps no greater than 8, or perhaps no greater than 7.33). The method may include the step of targeting the zone of groundwater contaminated with DNAPL in the aquifer while amending the aquifer with uric acid. Results of tests involving such method may be shown in, e.g., Study 3.

At least one inventive method may comprise the steps of assuring a molar ratio of carbon to nutrient nitrogen in LNAPL and DNAPL-contaminated groundwater is no greater than 16 (or no greater than 120:15, or no greater than 110:15, or substantially 100:15, as but a few examples); assuring a molar ratio of carbon to a specific electron acceptor (e.g., nitrate, oxygen, iron, sulfur, as but a few examples) in the LNAPL and DNAPL-contaminated groundwater is no greater than 20 (or 10, or 2.5); and assuring a concentration of a specific bacteria (e.g., denitrifying bacteria, iron reducing bacteria, sulfate reducing bacteria, or metal reducing bacteria) in the LNAPL and DNAPL-contaminated groundwater is no less than 100 (or 1,000, or 10,000, or 100,000, e.g.) bacteria per milliliter of the LNAPL and DNAPL-contaminated groundwater. It may be that embodiments related to this method are perhaps more generally described as: assuring a molar ratio of carbon to nutrient nitrogen in LNAPL and DNAPL-contaminated groundwater is no greater than a carbon to nutrient nitrogen molar ratio upper limit for enhanced degradation (e.g., that C:N (nutrient) molar ratio which, if exceeded, would result in non-achievement of an intended or desired enhancement of biodegradation of LNAPL and/or DNAPL); assuring a molar ratio of carbon to a specific electron acceptor in said LNAPL and DNAPL-contaminated groundwater is no greater than a carbon to electron acceptor molar ratio upper limit for enhanced degradation (e.g., that C:electron acceptor molar ratio which, if exceeded, would result in non-achievement of an intended or desired enhancement of biodegradation of LNAPL and/or DNAPL); and assuring a concentration of a specific bacteria in said LNAPL and DNAPL-contaminated groundwater is no less than a bacterial concentration lower limit for enhanced degradation (e.g., that bacterial concentration (such as in number/volume of groundwater) which, if not met, would result in non-achievement of an intended or desired enhancement of biodegradation of LNAPL and/or DNAPL). The carbon to nutrient nitrogen molar ratio upper limits for enhanced degradation include but are not limited to: 20, 16, 10, 8 and 7.33; the carbon to electron acceptor molar ratio upper limits for enhanced degradation include but are not limited to: 30, 20, 10, 2.5, 5 and 0.5 (perhaps depending on the specific electron acceptor); and the bacterial concentration lower limits for enhanced degradation include but are not limited to: 100, 1,000 and 10,000.

As but one example, where it is assured that a molar ratio of carbon to nitrate (a specific type of electron acceptor) is no greater than 2.5, it may be that nitrate is used only as an electron acceptor. Just as one may assure that a condition exists either by: (a) checking whether that condition exists, determining that it does, and doing nothing in response; or (b) checking whether that condition exists, determining that it does not exist, and acting so as to make that condition exist, so too do each of the assuring steps of the claims include not amending in any manner groundwater that is determined (through measurement, e.g.) to have a certain condition, and amending (e.g., by adding a substance) groundwater that is determined to not have that certain condition.

It should also be understood that the term LNAPL and DNAPL-contaminated groundwater refers to an aquifer (defined herein as any volume of underground water) that has both LNAPL and DNAPL contamination, regardless of whether the contamination is separate, or whether a groundwater volume of any size shows LNAPL and DNAPL contamination. In many co-contaminated aquifers, freephase LNAPL may exist at the upper region of the aquifer, soluble LNAPL and DNAPL may each be found in intermediate heights of the aquifer, and, freephase DNAPL may exist at the bottom of the aquifer. Upon LNAPL degradation, LNAPL degradation products, which enhance DNAPL degradation may diffuse to regions of DNAPL degradation in the aquifer by diffusion based on differential concentrations. Of course, the ultimate goal of aspects of the inventive technology is contaminant degradation, and any embodiment may involve the step of biodegrading both LNAPL contaminant and DNAPL contaminant of the LNAPL and DNAPL-contaminated groundwater.

At least one embodiment of an inventive method may further comprise the step of assuring a molar ratio of carbon to phosphorus in the LNAPL and DNAPL-contaminated groundwater is no greater than 100:0.1, or perhaps no greater than 100:1.5 (where a 100:3 ratio may be viewed as ideal). Perhaps more generally, a related step may be described as assuring a molar ratio of carbon to phosphorus in LNAPL and DNAPL-contaminated groundwater is no greater than a carbon to phosphorus molar ratio upper limit for enhanced degradation (e.g., that C:P molar ratio which, if exceeded, would result in non-achievement of an intended or desired enhancement of biodegradation of LNAPL and/or DNAPL). The carbon to phosphorus molar ratio upper limits for enhanced degradation include but are not limited to: 100:0.1, 100:1.5. It is of note that a preferred C:N:P ratio of the groundwater may be 100:15:3. Such a ratio may result in an optimized bioremediation of contaminated groundwater, with enhanced speed and perhaps even thoroughness of contaminant degradation.

Embodiments may include the step of assuring a concentration of *Dehalococcoides* bacteria in the LNAPL AND DNAPL-contaminated groundwater is at least 10,000 bacteria per milliliter of contaminated groundwater. Such bacteria may be particularly effective in dechlorinating halogenated DNAPL contaminants such as TCE.

It is also of note that at times, degradation processes may lead to an increase in a $H_2S$ concentration, and such may inhibit further degradation. In order to determine whether the $H_2S$ concentration is too high, a concentration of $S^{2-}$ in the LNAPL and DNAPL-contaminated groundwater may be measured (as an indicator of $H_2S$ concentration) to ascertain whether it is less than 2 mM. If not, ferrous iron or iron chloride may be added to the LNAPL and DNAPL-contaminated groundwater to reduce the $H_2S$ concentration, thereby eliminating or at least reducing $H_2S$, which, as mentioned, can be a contaminant degradation inhibitor.

Depending on the specific electron source that is measured, the upper acceptable limit of the C:electron source molar ratio may be as follows: C:nitrate—2.5; C:Iron—0.5; C:Sulfur—5; and C:Oxygen—5. Adding oxygen may indeed convert anaerobic LNAPL and DNAPL-contaminated groundwater into aerobic LNAPL and DNAPL-contaminated groundwater.

Some of the pathways involving different electron acceptors include, but are not necessarily limited to:

Methanogenic/Fermentative Organic Matter Mineralization

$$2CH_2O \rightarrow CH_3COOH \rightarrow CH_4 + CO_2$$

Sulfate Reduction/OMO

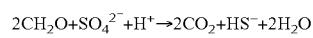

$$2CH_2O + SO_4^{2-} + H^+ \rightarrow 2CO_2 + HS^- + 2H_2O$$

Iron Reduction/OMO $$CH_2O + 4Fe(OH)_3 + 8H^+ \rightarrow CO_2 + 4Fe^{2+} 11H_2O$$

Manganese Reduction/OMO $$CH_2O + 2MnO_2 + 4H^+ \rightarrow CO_2 + 2Mn^{2+} + 3H_2O$$

Denitrification/OMO $$5CH_2O + 4NO_3^- + 4H^+ \rightarrow CO_2 + 2N_2 + 7H_2O$$

Aerobic Respiration/OMO $$CH_2O + O_2 + \rightarrow CO_2 + H_2O$$

It is of note that each of these reactions may be biologically catalyzed (such that above the reaction arrows in these formulas would be a specific type of bacteria (e.g., sulfate reducing bacteria, denitrifying bacteria, etc.).

In the case where a measured molar ratio of carbon to nitrogen in LNAPL and DNAPL-contaminated groundwater is greater than 120:15 (or some other value, perhaps), a nitrogen source (e.g., a nutrient nitrogen source) may be added to the groundwater. Such nutrient nitrogen source includes but is not limited to: uric acid, ammonium, poultry manure, and nitrate.

The step of assuring a concentration of bacteria in contaminated groundwater is no less than 100 (or other figure) bacteria per milliliter of the LNAPL and DNAPL-contaminated groundwater comprises the step of adding microbial substrate to the LNAPL and DNAPL-contaminated groundwater. Such substrate (lactate or milk, as but two examples) may serve as energy source for the bacteria, helping them to grow in number and perhaps ability to degrade contaminant).

Aspects of the inventive technology may further comprise the step of assuring a cis-DCE or VC (intermediate dehalogenation products) degradation rate is at least 20% per two month period. If such degradation rate(s) are lower, then they can be enhanced upon the addition of *Dehalococcoides* to the groundwater.

At least one embodiment of a groundwater multi-contaminant biodegradation method (e.g., a method designed to enhance the biodegradation of more than one contaminant (e.g., DNAPL and LNAPL) may comprise the steps of: amending groundwater contaminated with LNAPL contaminant and DNAPL contaminant to enhance biodegradation of both the LNAPL contaminant and the DNAPL contaminant (e.g., by adding an electron acceptor, nitrogen source, microbial substrate, bacteria to the groundwater); biodegrading the LNAPL contaminant in the groundwater; generating LNAPL biodegradation products (lactate, pyruvate, acetate or fatty acids); degrading the LNAPL biodegradation products (e.g., with fermenting bacteria or acetogens); generating hydrogen as a result of the step of degrading the LNAPL biodegradation products; enhancing reductive dehalogenation of DNAPL with the hydrogen; generating less halogenated, intermediate, DNAPL biodegredation products (cis DCE, vinyl chloride or ethane, as but a few of many possible examples) as a result of the step of enhancing reductive dehalogenation of DNAPL with the hydrogen; and generating non-halogenated end products (e.g., ethane) as a result of the step of enhancing reductive dehalogenation of DNAPL with the hydrogen.

The step of amending may include adding one or more substances (a broad term including living and non-living things), such as nitrogen source (e.g., nutrient nitrogen source), electron acceptor, and/or bacteria, as but a few examples. The method may further comprise the step of generating at least one of organic compounds that are smaller chained than LNAPL source hydrocarbons, fatty acids, and carbon dioxide as a result of the step of degrading the LNAPL biodegradation products. Further, the step of enhancing reductive dehalogenation of DNAPL with the hydrogen may involve use by the bacteria (e.g., as an energy source) of protons and electrons from the hydrogen. Certainly other substances may also be acting as substrates for the DNAPL (e.g., lactate).

It is important to understand that any of the inventive methods described above may indeed be used, in analogous manner, to enhance the bioremediation of contaminated soil (e.g., soil contaminated with DNAPL and LNAPL). Indeed, this disclosure should be viewed as supporting such contaminated soil bioremediation methods. In order to achieve such bioremediation, the soil may first need to be converted into slurry form (with addition of water); such slurry can then be bioremediated using the above described methods. Simply the term groundwater as used in the above descriptions can be replaced with the term slurry for an accurate description of the steps involved in remediation of a contaminated soil in slurry form.

It is of note that any of the inventive methods would, upon disclosure to one of ordinary skill in the art, be readily practiced by such person. Any measurements that must be taken may simply involve the use of known measuring equipment, whether they be taken in situ or ex situ (e.g., after a sample is drawn). Further, any amendments that are made may simply involve the injection of a substance into the groundwater, whether with pressure or not, using conventional equipment.

Studies

Study Set 1: Biodegradation of Hydrocarbons in Soil by Uric Acid Addition

Petroleum-contaminated soil was collected from a contaminated site in California. Dominant contaminants are diesel range hydrocarbons. The soil contained 0.0862% total N, 7.0 mg/kg total P, and 4.08% total petroleum hydrocarbon (TPH). The saturated soil water content (volumetric) was determined to be approximately 0.36. Respirometer tests using Columbus Instruments Micro-Oxymax Respirometer (Columbus, Ohio) equipped with $CO_2$ sensors were used to monitor microbial respiration, which is a key indicator for biodegradation.

In the tests, each treatment was set up in triplicates. Controls had no nutrient addition. C:N ratios were maintained at the same level in all samples. $NH_4NO_3$ and uric acid were the two nutrients under study.

Figure 2:
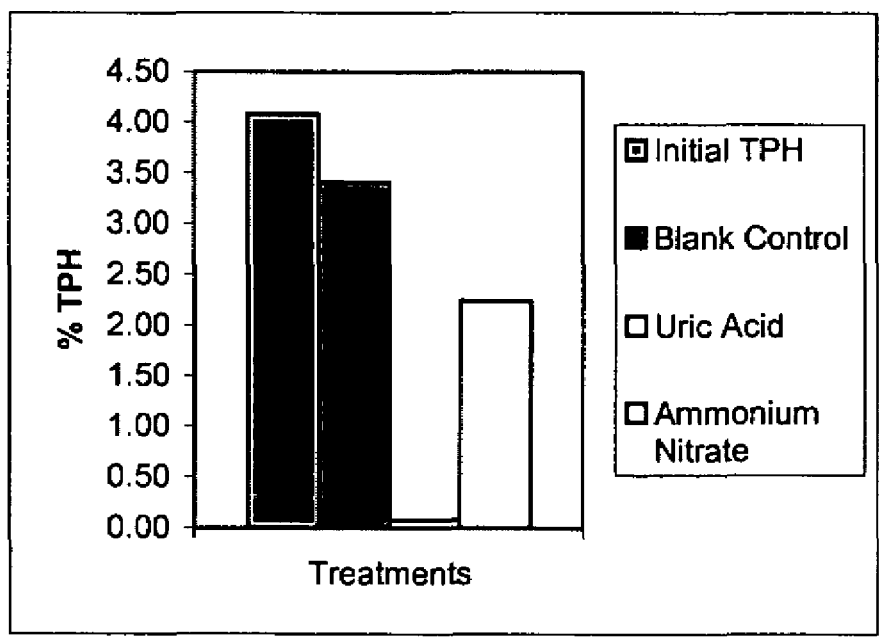
FIG. 2 shows results from an example of the percentage (%) TPH degradation after 108 hours in accordance with embodiments of the present inventive technology (see also Study Set 1).

The $CO_2$ data, as shown in FIGS. 1 and 2 may suggest that uric acid may be significantly more effective than ammonium nitrate in enhancing the biodegradation of petroleum contaminants. The amount of $CO_2$ accumulated in the uric acid treatments may be about 50 times greater than that in the ammonium nitrate treatments. The TPH data verifies uric acid's effectiveness in enhancing biodegradation, yielding about 98% depletion in TPH after 108 hours. FIG. 1 shows results from an example of a $CO_2$ accumulation in an uric acid study. FIG. 2 shows results from an example of the % (percentage) TPH after 108 hours.

In a scaled up test, a bioreactor, as those skilled in the art can appreciate, was used to test an enhanced biodegradation of the petroleum contaminants impacted soil from California. 4 kg of soil was placed in a bioreactor. 1.44 L of water was added to the soil along with 63.6 g uric acid (C:N=110:

10). The bioreactor was sealed and constantly aerated at room temperature (about 16-20° C.).

Figure 3:
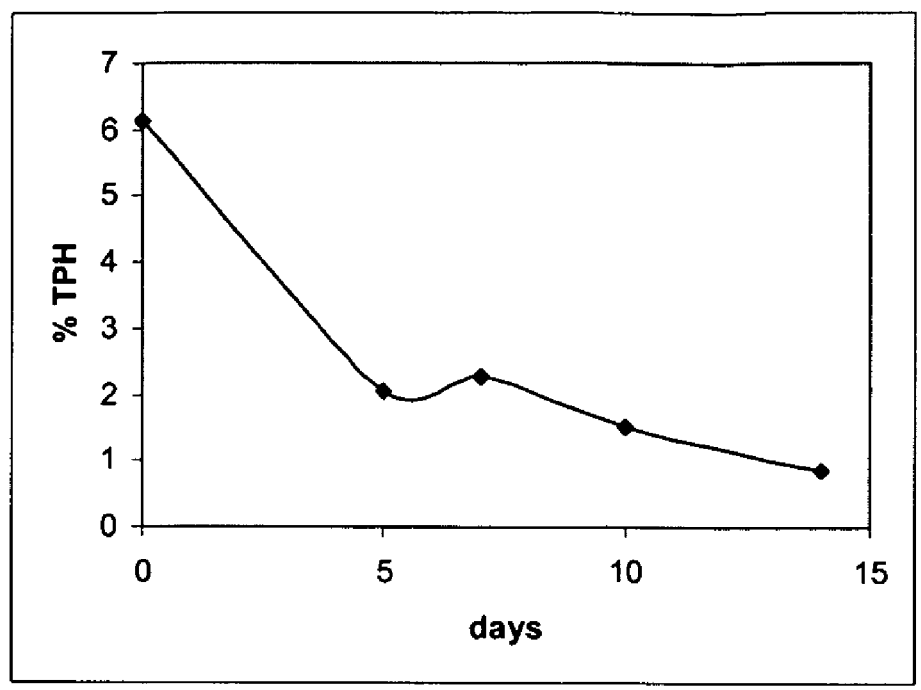
FIG. 3 shows (%) TPH results from an example of an uric acid enhancement of LNAPL degradation in a bioreactor in accordance with embodiments of the present inventive technology (see also Study Set 1).

FIG. 3 shows results from an example of an uric acid enhancement of LNAPL degradation in a bioreactor. A bioreactor was operated for 14 days with daily $O_2$ monitoring. $O_2$ was maintained at above 20% throughout the test. Soil samples were taken at select intervals as shown in the FIG. 3. The results show an 86% depletion of TPH after 14 days.

In another study, soil from a different source was tested. Uric-acid containing poultry wastes were used in the study. Soil used in the following studies contains clay textured with a saturated water content of 0.4. A 1:1 mixture of diesel and motor oil was added to the soil to create a final TPH concentration of 5%.

Microcosm studies using a respirometer to monitor microbial respiration were conducted by treating 20 g of contaminated soil. Treatments included 1.21 g ammonium nitrate, 0.318 g uric acid, and 0.318 g poultry wastes. All samples were saturated with water (water content of 0.4) and monitored at 20° C.

Figure 4:
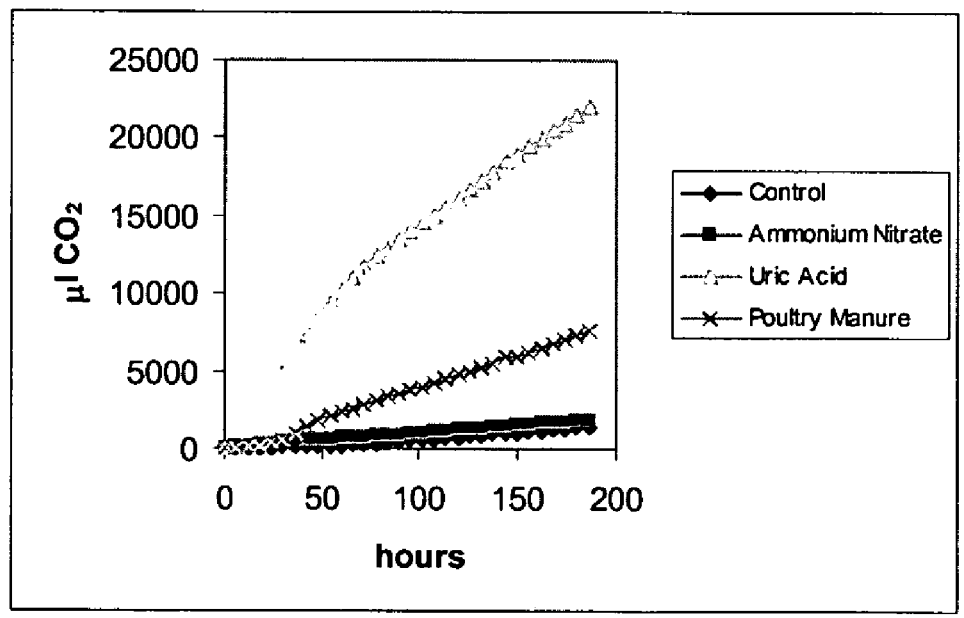
FIG. 4 shows results of an example of uric acid and poultry waste enhancement of LNAPL biodegradation, as indicated by microbially respired $CO_2$, in accordance with embodiments of the present inventive technology (see also Study Set 1).

$CO_2$ results as shown in FIG. 4 suggest that the most active biodegradation may occur in the uric acid treatments, followed by the poultry wastes treatments. FIG. 4 shows results of an example of poultry wastes enhancement of LNAPL biodegradation.

A bioreactor may be used to test the effect of poultry wastes addition on the biodegradation of petroleum contaminants in soil. Four kg of soil was placed inside a bioreactor and treated with 63.6 g of poultry wastes. 1.6 L of water was added to the treatment. A bioreactor was sealed and aerated at room temperature.

Figure 5:
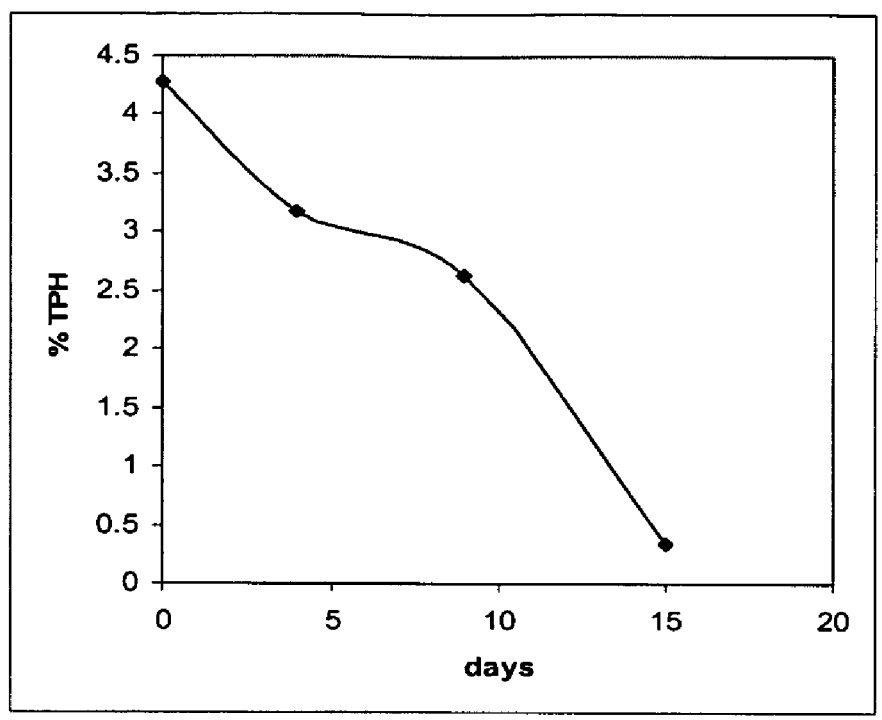
FIG. 5 shows (%) TPH results of an example of LNAPL biodegradation in a poultry waste amended bioreactor in accordance with embodiments of the present inventive technology (see also Study Set 1).

Within 15 days, concentration of TPH may decrease about 92.3% in the soil treated in a bioreactor (see FIG. 5). FIG. 5 shows results of an example of LNAPL biodegradation in a poultry wastes amended bioreactor.

Study 2

In another study, different amounts of poultry wastes were added into the microcosms containing petroleum constituents. Treatments of 20 g of soil included 0.80, 1.59, and 3.18 wt % poultry wastes, and 1.21 g ammonium nitrate. The water content was increased to 0.4 for each treatment, and the samples were incubated at 20° C.

Figure 6:
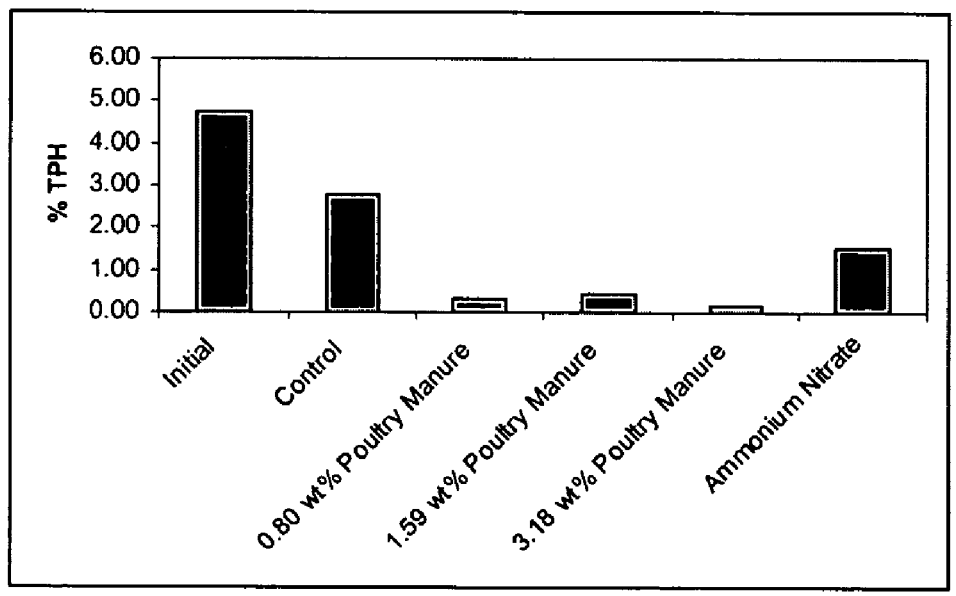
FIG. 6 shows (%) TPH results from an example of biodegradation of LNAPL with different amounts of poultry waste amendments in accordance with embodiments of the present inventive technology (see Study 2).

FIG. 6 shows results from an example of biodegradation of LNAPL with different amounts of poultry waste amendments. The results in FIG. 6 show that microbial activities may be increased with increased poultry manure amendments. The TPH results may demonstrate about 90% degradation in poultry manure treatments. The TPH concentration of the ammonium nitrate treatment may decrease about 67.5%.

Study 3: Uric Acid-Nitrogen Release in Groundwater

The selected study location Site D-2 is a former landfill, located in Lackland Air Force Base, San Antonio, Tex. The site, as of Jul. 19, 2005, part of a golf course. The site is within a flood plain which is under water almost yearly.

Microcosm Setup: Groundwater samples were collected from a known TCE-impacted location in Lackland Air Force Base (San Antonio, Tex.). Microcosms were established under anaerobic conditions in the anaerobic chamber with nitrogen as the make-up gas. All microcosms were sealed with Teflon-coated septa and aluminum crimps. Amendments were added into corresponding microcosms to serve as substrate/electron donor and nutrient source, based on results from a previous study. Substrates and nutrient dosages were calculated based on stoichiometric needs to achieve a complete degradation of diesel range hydrocarbons and reductive dechlorination of TCE. Uric acid and poultry manure were added for additional sources of nitrogen required for amino acid production and other essential metabolisms. Groundwater with no amendments serves as the background control.

Microcosms were established in triplicates with 5 wt % soil added and stored at room temperature in the dark. Samples were monitored at various intervals during the incubation period of 320 days. During each sampling event, parameters including pH, oxidation-reduction potential (ORP) were measured when samples were taken. Total petroleum hydrocarbon-diesel range organics (TPH-DRO), TPH-gasoline range organics (GRO), TCE, DCE, VC, and anions were analyzed as described in the above section.

The treatments were setup as follows:
A. Live Control
B. $KNO_3$
C. Uric Acid
D. Poultry Manure
E. Lactate
F. Lactate+$KNO_3$
G. Lactate+$KNO_3$+Uric Acid
H. Milk+$KNO_3$
I. Milk+$KNO_3$
J. Milk+$KNO_3$+Uric Acid
K. Milk+Poultry Manure+$KNO_3$ All microcosms were set up in an anaerobic chamber with $N_2$ as the base gas.

The site contains general refuse, construction debris, and drummed waste oil and spent solvent sludge. The drums have deteriorated and leaking appears to have occurred at the site. Both dense and light non-aqueous phase liquid (DNAPL and LNAPL) are observed in limited wells, with the bulk of the component being weathered motor oil, jet fuel, and TCE. The source area with drums is approximately 200 ft by 250 ft. The groundwater in the source area contains weathered petroleum hydrocarbon as well as both TCE and its degradation products mainly cis-DCE and VC. The groundwater plume outside the source zone, however, contains mainly cis-DCE and VC, which extends approximately 3000 ft. The leading edge borders a creek, which is the natural discharge point for the groundwater.

In this study, groundwater contained elevated amount of organic compounds. In sterile treatments, groundwater was autoclaved. Uric acid was added to the sterile and the non-sterile groundwater samples.

Figure 7:
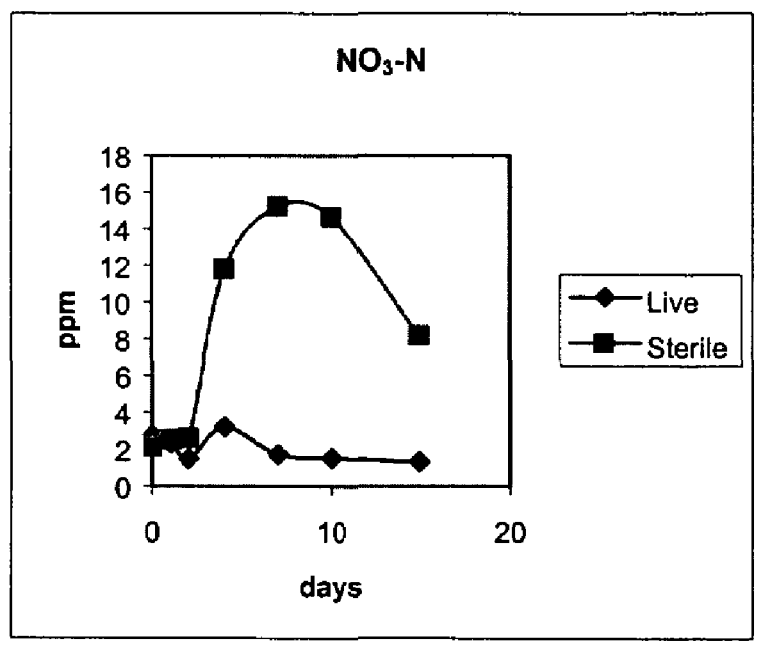
FIG. 7 shows results (in ppm) from an example of nitrate released from uric acid and consumed by microbes over 14 days in groundwater in accordance with embodiments of the present inventive technology (see Study 3).
Figure 8:
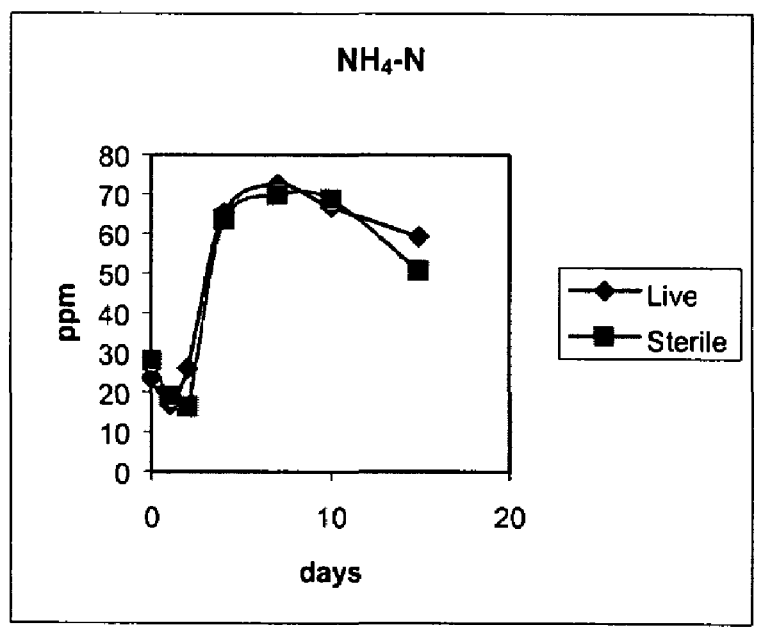
FIG. 8 shows results (in ppm) from an example of ammonium released from uric acid and consumed by microbes in groundwater in accordance with embodiments of the present inventive technology (see Study 3).
Figure 9:
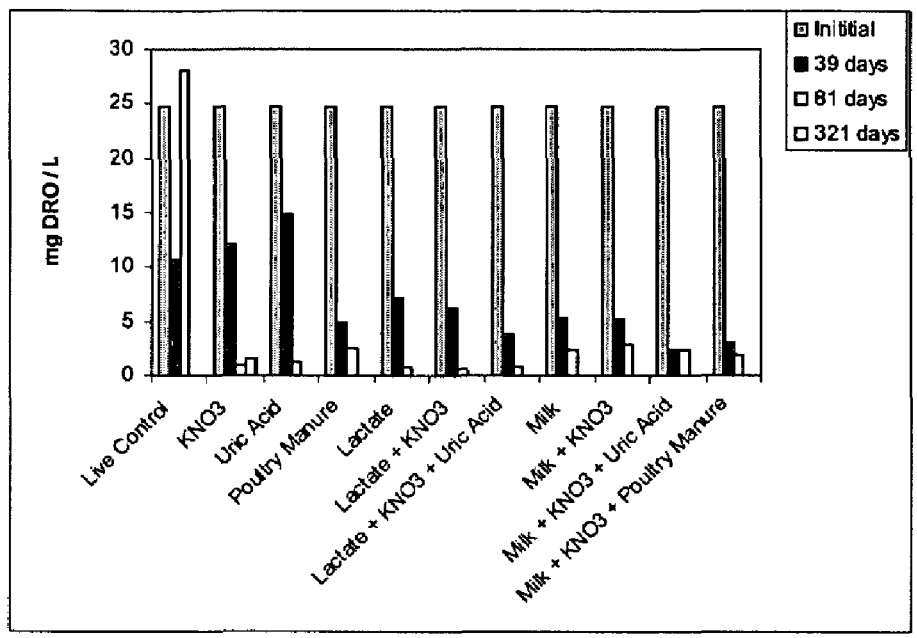
FIG. 9 shows DRO (in mg/l) results from an example of an enhancement of LNAPL degradation in groundwater in accordance with embodiments of the present inventive technology (see Study 3).
Figure 10:
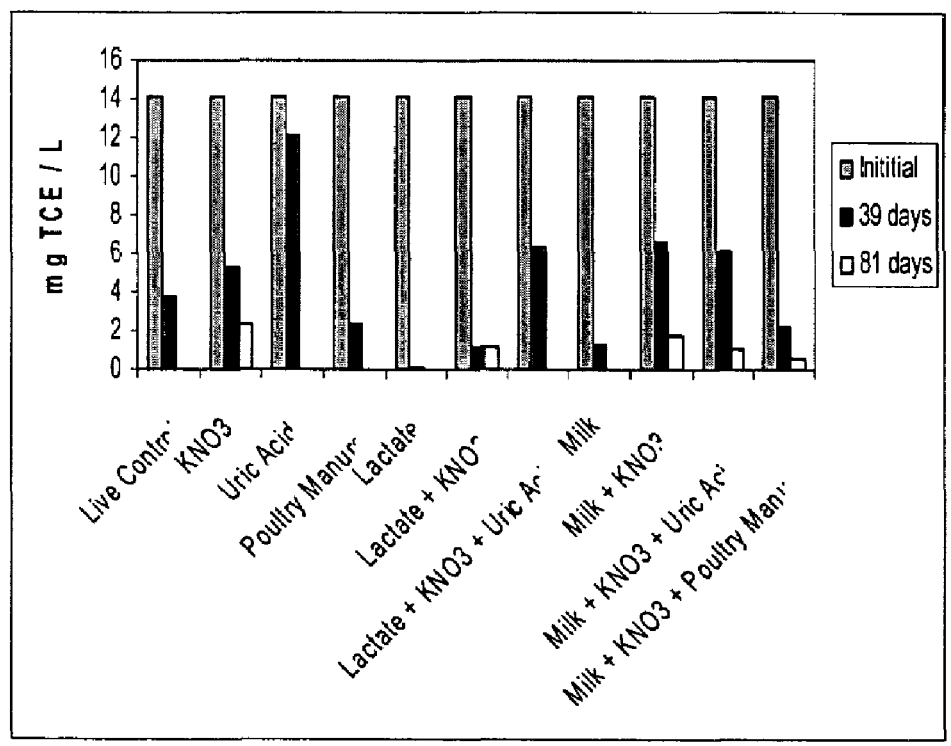
FIG. 10 shows TCE (mg/l) results from an example of a follow-up enhancement of dechlorination of DNAPL (e.g., TCE) in groundwater in accordance with embodiments of the present inventive technology (see Study 3).

In the sterile groundwater, nitrate was released from the uric acid through duration of over 14 days, perhaps representing a relatively slow-releasing mechanism. It may also suggest that the nitrate releasing from uric acid may be non-biological. In the non-sterile samples, nitrate may remain at a relatively low level, when compared to the sterile samples, as can be understood from FIG. 7. This may be presumably due to the denitrification process that consumed the nitrate released from the uric acid, as both an electron acceptor and nitrogen nutrient. As shown in FIG. 8, the releasing of ammonium from uric acid may also last for approximately 14 days. Amounts of ammonium in both sterile and non-sterile samples may be comparable throughout the testing period. This may be due to the consumption of nitrate as the nitrogen nutrient by indigenous microbes. FIG. 8 shows results from an example of nitrogen released from uric acid in groundwater. FIG. 9 shows results from an example of an enhancement of LNAPL degradation in groundwater. FIG. 10 shows results from an example of a follow-up enhancement of dechlorination of DNAPL (e.g., TCE) in groundwater.

Diesel range hydrocarbons in the microcosms with both substrate and nutrient enhancements, as indicated by TPH-DRO (see FIG. 9), were depleted during the initial 81 days of incubation. In control microcosms, TPH-DRO remained unchanged during the same period of time, although depleted during the follow-up incubation period (321 days). The highest rates of DRO depletion were observed in microcosms amended with lactate, which is presumed as a favorable carbon source for a majority of microbial populations. Milk amendment shows a lower enhancement in denitrifying rates. Nutrient (N) amended microcosms also demonstrate increased rates of nitrate depletion; however, the effectiveness appears to be less than that in the lactate-amended microcosms.

TCE concentrations decreased in all microcosms, including the non-amended controls. As shown in FIG. 10, the highest TCE degradation rates were observed in microcosms amended with lactate and milk, both known as the preferred substrates and electron source for dehalogenating microbes. TCE degradation rate in the live control was equivalent to that in some of the amended microcosms. Microcosms amended with lactate show a synchronized enhancement in the degradation of both TPH-DRO and TCE. Milk appears to be particularly effective in enhancing the TCE degradation.

Study 4

In Study 4, TCE is the constituent of concern, serving as the model DNAPL. Diesel range hydrocarbons were the representative LANPL. "Higher-redox" reaction of denitrification was enhanced to degrade LNAPL into smaller organic compounds and final products of carbon dioxide ($CO_2$). This pathway consumes electron acceptors at higher redox potential, and shifts the system towards more reduced, lower redox conditions, under which reductive dehalogenation (e.g., dechlorination) of DNAPL tends to occurs. Small organic compounds from the LNAPL degradation may serve as substrates and sources of hydrogen and electrons, sustaining reductive dechlorination of DNAPL and other "low-redox" pathways such as sulfidogenesis and methanogenesis. In the groundwater contaminated by both petroleum constituents and TCE, nitrogen nutrients were added to reach the C:N balance and enhance petroleum hydrocarbon biodegradation. At the same time, the nitrogen amendments may also feed the process of TCE reductive dechlorination. Substrates that can be rapidly amenable to denitrifiers and sulfate reducers were also added to accelerate these pathways at the initial phase of this study.

Nitrate reducing conditions will be enhanced in this study to efficiently breakdown LNAPL hydrocarbons, while also providing substrate for reductive dechlorination from sulfate reduction pathway, a preferred pathway in the lower redox environment resulting from LNAPL degradation. Eventual consumption of sulfate may lead to methanogenic conditions where the remaining halogenated compounds (e.g., chlorinated ethenes) may be completely dehalogenated (e.g., dechlorinated to ethane).

Chemicals and Analysis

All chemicals used in this study were reagent grade unless otherwise noted. TCE, cis-DCE, VC, ferrous chloride ($FeCl_2$), and sodium sulfate ($Na_2SO_4$) were purchased from Aldrich Chemicals Co. (Milwaukee, Wis.) and used in sample amendments and preparation as analytical standards. Nitrogen gas was used as headspace gas in microcosm setup. Returned/spoiled milk was kindly provided by Mayfield Diary Plant (McMinnville, Tenn.).

TCE, cis-DCE, and VC were analyzed with a mass spectrum gas chromatograph (GC) equipped with flame ionization detection (FID), using the purge and trap technique. Sulfate and nitrate were detected with a Dionex-100 Ion Chromatograph (IC). Sulfide was detected using colorimetric method (E376.2) at 625 nm using a Shimadzu UV-vis spectrophotometer. Ammonium was monitored using calorimetric method at 636 nm by employing the indophenol blue method as described by Keeney and Nelson (1982). Iron and manganese were analyzed by atomic absorption spectroscopy.

Microcosm Setup

The microcosm setup of Study 4 is identical to the microcosm setup of Study 3.

Field Measurements

Groundwater was collected from two monitoring wells (SS032MW008 and LF012MW002). During the sampling event, parameters of pH, temperature, turbidity and specific conductance were measured.

Groundwater Baseline Characterization

Groundwater and surrounding soil were collected by SAIC at three well locations. The following parameters were analyzed:

| Parameter | Method |
|---|---|
| Nitrate-N | Ion Chromatography |
| Sulfate | Ion Chromatography |
| Ammonium-N | Colorimetric |
| Gasoline Range Organics (GRO) | GC-MS |
| Diesel Range Organics (DRO) | GC-FID |
| Trichloroethylene (TCE) | GC-MS |
| Cis-1,2-Dichloroethylene (DCE) | GC-MS |
| Vinyl Chloride (VC) | GC-MS |
| Total Iron | ICP-MS |

TPH-DRO and TPH-GRO for soils were extracted with dichloromethane and analyzed by GC-FID. Chlorinated ethenes and total iron were not analyzed for soil.

Field Monitoring of Groundwater Samples—Study 4

Field parameters were measured during the groundwater sampling and the results are summarized in Table 1. The pH values were measured in the neutral range, which is in favor of biological pathways.

TABLE 1

Groundwater Field Monitoring

| Well ID | pH | Temperature, ° C. | Turbidity, NTU | Conductance, mS/cm |
|---|---|---|---|---|
| SS032MW008 | 6.67 | 23.6 | | 3061.17 |
| LF012MW002 | 6.41 | 22.7 | 4 | 1.32 |

Groundwater Baseline Characterization

Results from groundwater baseline characterizations are summarized in Tables 2 and 3. Sulfate exists at elevated concentrations (6-239 mg/l) in the groundwater, while nitrate and iron were detected at low concentrations. This indicates that sulfate-reducing metabolism probably dominates in the groundwater. TPH-DRO remains at 24.7 mg/l in groundwater collected from well SS032MW149.

TABLE 2

Baseline Characterization (I)

| Sample | $NO_3$—N, mg/l | $NH_4$—N, mg/l | $SO_4^{2-}$, mg/l | Fe, □g/l | GRO, mg/l | DRO, mg/l |
|---|---|---|---|---|---|---|
| LF012MW149 Soil | <0.100 | 1.259 | 28.723 | | | <10 |
| LF012MW002 Soil | <0.100 | 1.679 | <0.100 | | | <10 |
| SS032MW008 Soil | <0.100 | 1.511 | <0.100 | | | <10 |
| LF012MW149 Water | 0.851 | 4.030 | 239.291 | 7.0 | | 24.7 |
| LF012MW002 Water | 3.667 | 0.336 | 94.488 | 0.9 | | <10 |
| SS032MW008 Water | 0.743 | 0.504 | 6.047 | 0.8 | | <10 |

TABLE 3

Baseline Characterization (II)

| Sample | Trichloroethene, mg/l | cis-1,2-Dichloroethene, mg/l | Vinyl Chloride, mg/l |
|---|---|---|---|
| LF012MW149 Water | 14.14 | 14.45 | 2.52 |
| LF012MW002 Water | <0.004 | 5.27 | 9.21 |
| SS032MW008 Water | 2.94 | 1.83 | <0.004 |

Microcosm Studies

Figure 11:
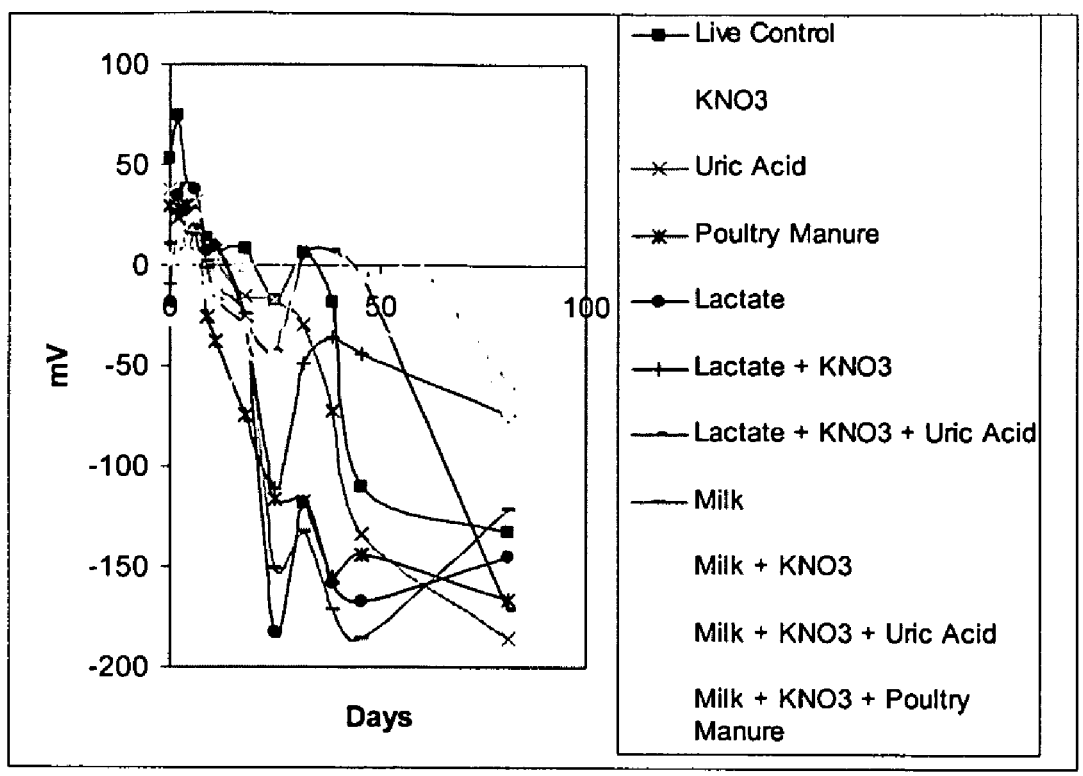
FIG. 11 shows measured ORP results as observed in Study 4.
Figure 12:
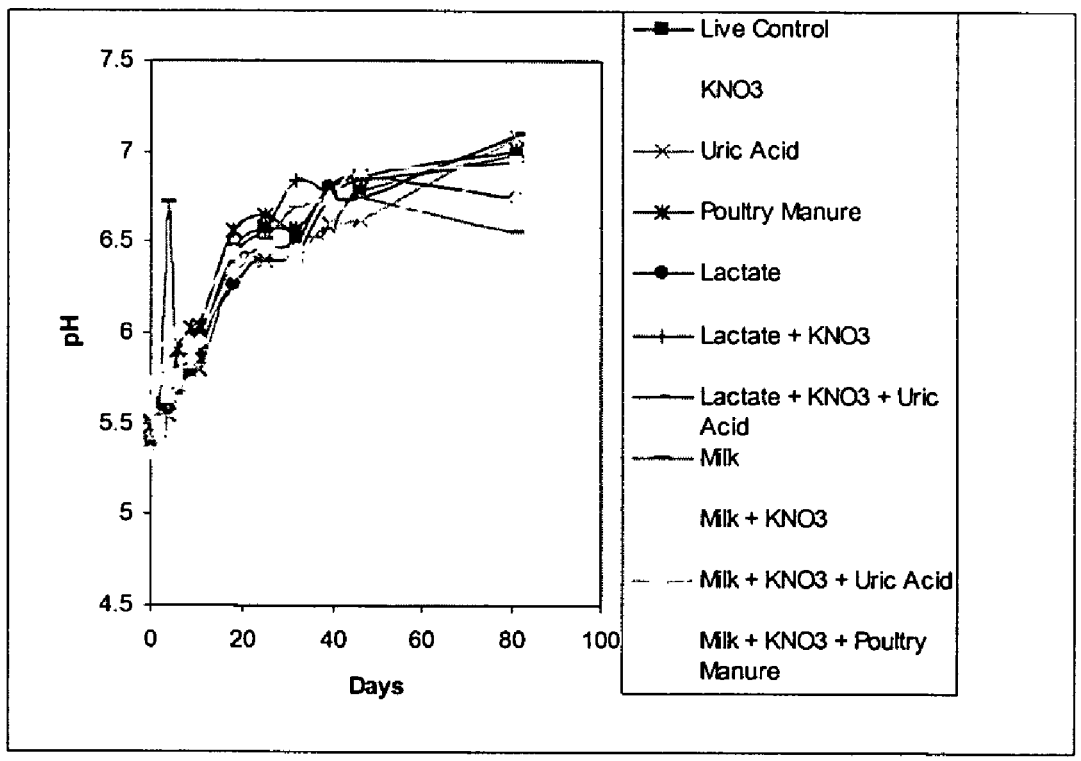
FIG. 12 shows measured pH results as observed in Study 4.

ORP readings in all the microcosms decreased within days of establishment (FIG. 11), indicating the anaerobic condition in the groundwater onsite. Measurements of pH in all the treatments were in the neutral range (6.55-7.24) during the extended period of incubation (FIG. 12). Apparently the pH condition is in favor of the majority of biological pathways, including denitrification and reductive dechlorination.

Figure 13:
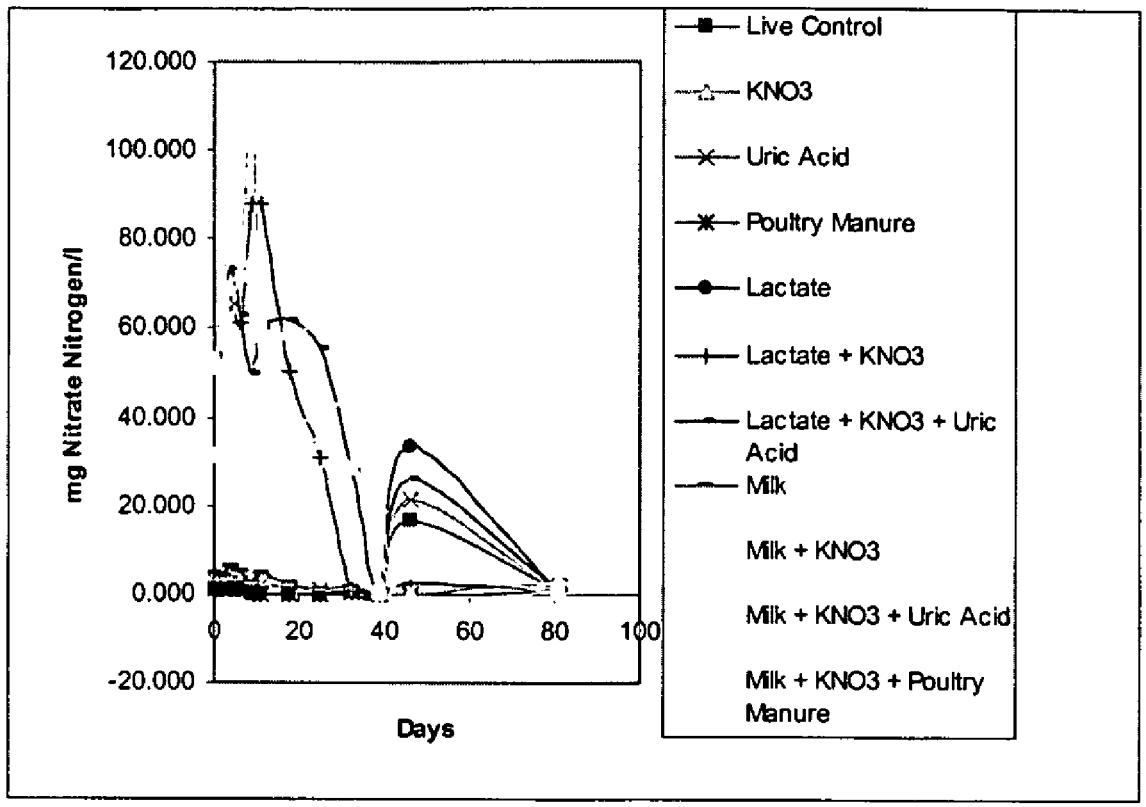
FIG. 13 shows measured nitrate results as observed in Study 4.

Nitrate was depleted in all microcosms down to trace levels (<1.000 mg/l) during 40 days of incubation (FIG. 13). The nitrate respiked into the microcosms and was also depleted rapidly in all microcosms, as shown in FIG. 3. This result indicates the active denitrification activities. The amendments of "easy" substrates such as lactate and milk or nutrients did not show observable enhancement of denitrifying rates; the background denitrification appears to be aggressive with no amendments, as shown in the control microcosms.

Figure 14:
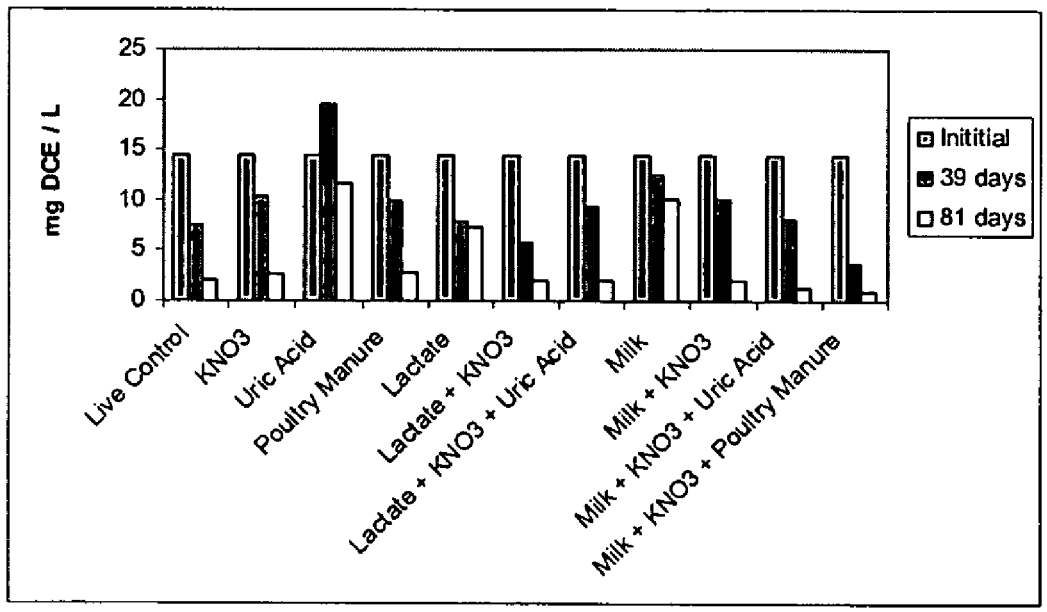
FIG. 14 shows measured DCE results as observed in Study 4.

DCE was detected in all microcosms, demonstrating a typical product from the reductive dechlorination of TCE. DCE accumulation was observed at the elevated level in microcosms amended with uric acid, lactate and milk, the latter two achieved the high rates of TCE degradation (FIG. 14). These results verify that the enhanced TCE degradation was reductive dechlorination, with DCE as an intermediate product. DCE was depleted in all microcosms after 300 days of incubation (non-detection measurements not shown), demonstrating its nature of tentative accumulation in the TCE degradation process.

Figure 15:
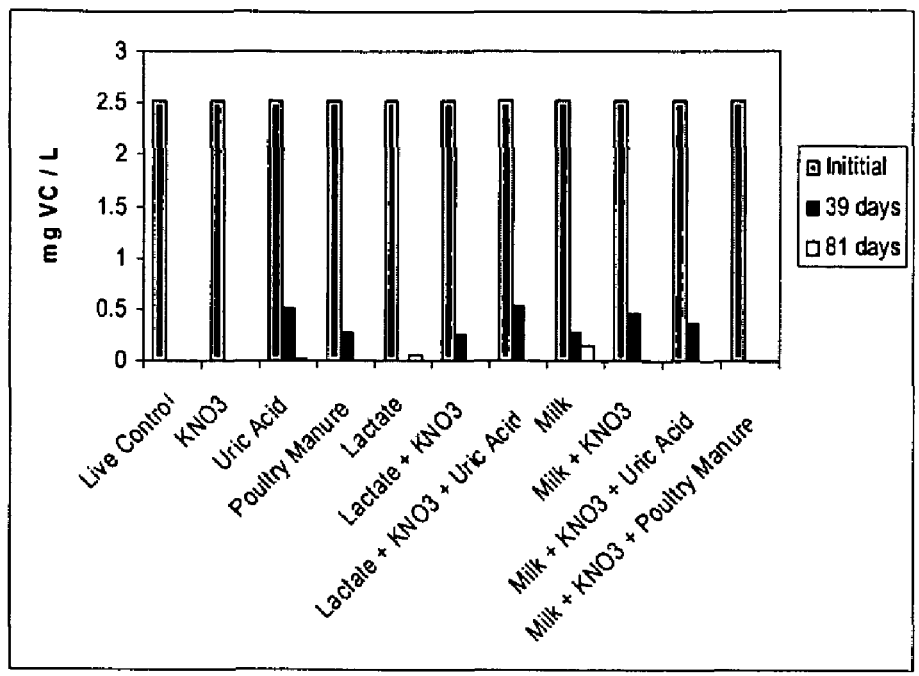
FIG. 15 shows measured VC results as observed in Study 4.

VC was only detected in some microcosms with amendments (see FIG. 15). As another intermediate compound generated from the TCE degradation pathway, VC demonstrated a tentative accumulation at low concentrations in the microcosms. VC was depleted in all microcosms after 300 days of incubation (non-detection measurements not shown).

No ethane was detected in the microcosms, probably due to its small quantity and potential loss during the events of ORP and pH measurements when samples were taken for analysis.

In summary, the results from this study suggest that an in-situ natural attenuation is actively occurring, which can achieve the degradation of both LNAPL and DNAPL in the groundwater over an extended period of time (approximately 300 days based on laboratory estimation).

Figure 16:
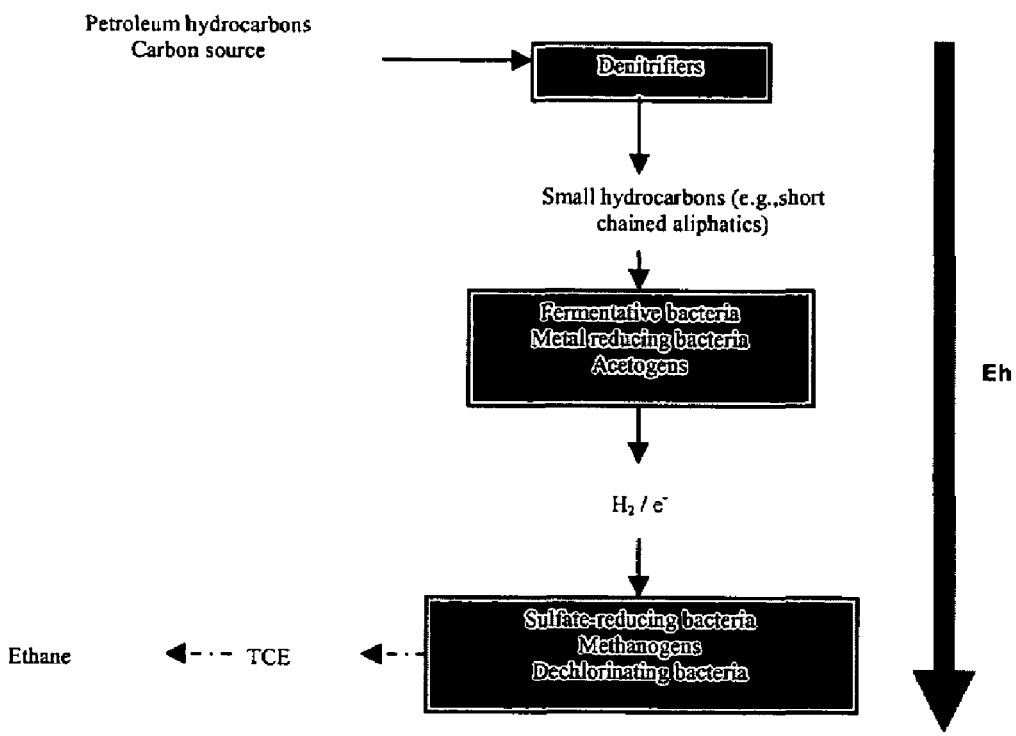
FIG. 16 shows a possible sequential mechanism by which at least certain aspects of biologically catalyzed degradation of LNAPL and DNAPL contaminants may be carried out.
Figure 17:
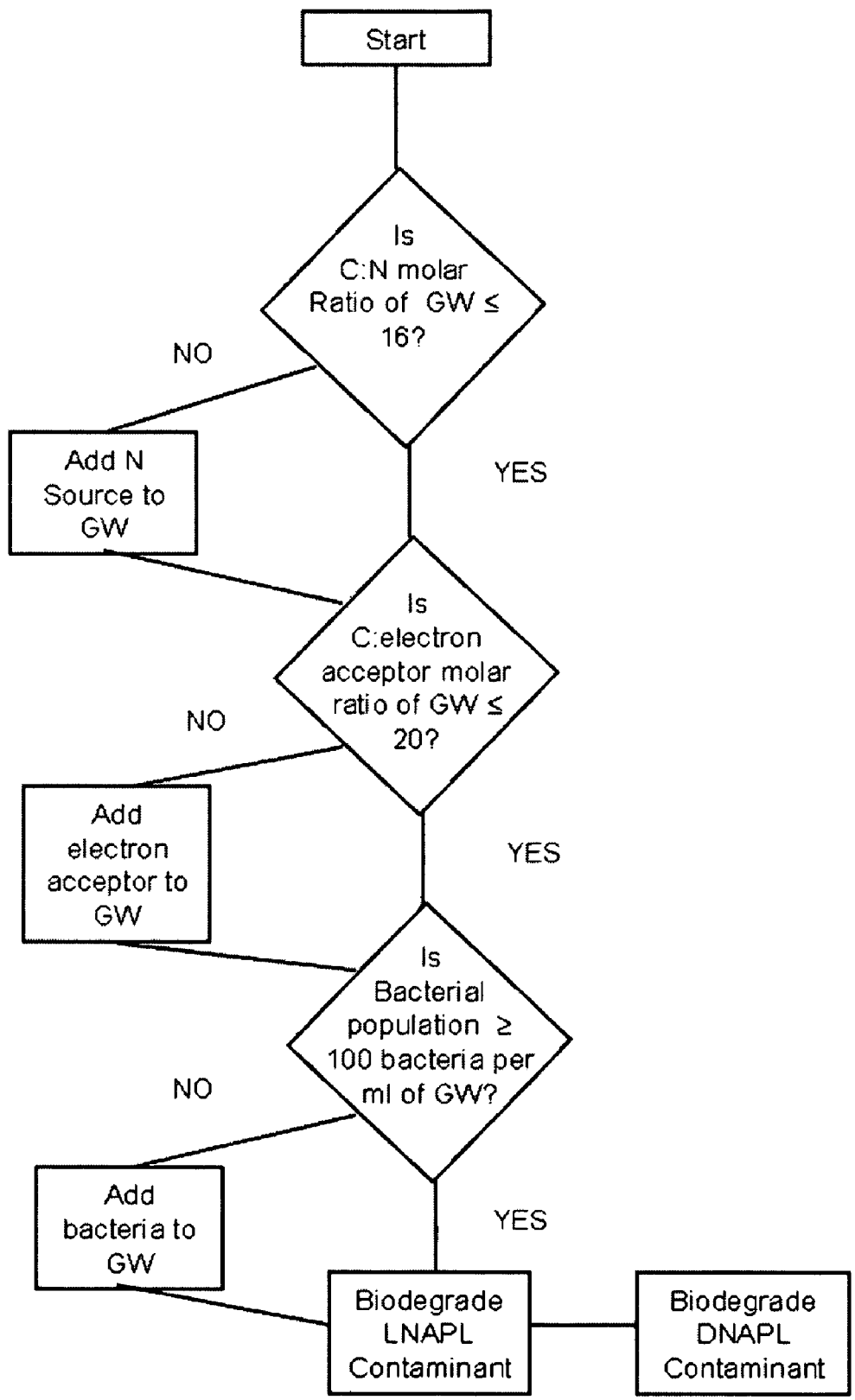
FIG. 17 shows a flow chart indicating possible steps that may be followed in some embodiments of the inventive technology related to enhanced biodegradation of LNAPL and DNAPL contaminated groundwater.

The hypothesized mechanism is presented in FIG. 16. Petroleum compounds, such as constituents in the LNAPL range, may be degraded by anaerobic pathways like denitrification generating smaller molecular compounds (e.g., fattic acid). These small compounds can be further degraded into the simple compounds such as acetate and hydrogen through fermentative and other microbial metabolisms. Hydrogen serves as the substrate/electron source for dechlorinating microorganisms, and reductively degrades TCE to its eventual product of ethane.

The biological degradative process may be enhanced by amending the system with microbially preferred substrates such as lactate and milk (containing lactic acid and other nutrient elements). These substrates can be quickly metabolized by a wide spectrum of microbes and provide abundant amount of simple compounds. Amendment of these substrates may also increase the microbial biomass during a short period of time, therefore enhance the degradation of LNAPL and DNAPL.

Nutrient amendment also demonstrates its role in the enhancement of biodegradation of LANPL and DNAPL; however, the level of enhancement achieved by nutrient amendments appears to be less significant than substrate amendment.

Data obtained to date demonstrate that complete depletion of both LNAPL (diesel range hydrocarbon) and DNAPL (TCE) are achievable under the in situ conditions, demonstrating an active natural attenuation. The biodegradation may be accelerated through the co-enhancement technique. Amendments of microbially preferred substrates such as lactate are most effective in enhancing the degradation of both LANPL and DNAPL. Nutrient balance also shows positive role in the biological enhancement.

As can be easily understood from the foregoing, the basic concepts of the present inventive technology may be embodied in a variety of ways. It involves both degradable techniques as well as devices to accomplish the appropriate degradation. In this application, the degradable techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this non-provisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "contaminant" should be understood to encompass disclosure of the act of "contaminating"—whether explicitly discussed or not—and, conversely, were there effectively disclosure of the act of "contaminating", such a disclosure should be understood to encompass disclosure of a "contaminant" and even a "means for contaminating." Such changes and alternative terms are to be understood to be explicitly included in the description.

Any patent applications, patents, publications, or other references mentioned in this application for patent are hereby incorporated by reference. Any patents or patent applications made in any priority claim herein or thereafter in a subsequent filing are hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of inventive technology to at least: i) each of the degradation devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method comprising the steps of:
   assuring a molar ratio of carbon to nutrient nitrogen in LNAPL and DNAPL-contaminated groundwater is no greater than 16;
   assuring a molar ratio of carbon to a specific electron acceptor in said LNAPL and DNAPL-contaminated groundwater is no greater than 20; and
   assuring a concentration of a specific bacteria in said LNAPL and DNAPL-contaminated groundwater is no less than 100 bacteria per milliliter of said LNAPL and DNAPL-contaminated groundwater.

2. A method as described in claim 1 wherein said step of assuring a concentration of a specific bacteria in said LNAPL and DNAPL-contaminated groundwater is no less than 100 bacteria per milliliter of said LNAPL and DNAPL-contaminated groundwater comprises the step of assuring a concentration of denitrifying bacteria, iron reducing bacteria, sulfate reducing bacteria, or metal reducing bacteria in said LNAPL and DNAPL-contaminated groundwater is no less than 100 bacteria per milliliter of said LNAPL and DNAPL-contaminated groundwater.

3. A method as described in claim 1 further comprising the step of assuring a molar ratio of carbon to phosphorus in said LNAPL and DNAPL-contaminated groundwater is no greater than 100:0.1.

4. A method as described in claim 3 wherein said step of assuring a molar ratio of carbon to phosphorus in said LNAPL and DNAPL-contaminated groundwater is no greater than 100:0.1 comprises the step of assuring a molar ratio of carbon to phosphorus in said LNAPL and DNAPL-contaminated groundwater is no greater than 100:1.5.

5. A method as described in claim 1 further comprising the step of biodegrading both LNAPL contaminant and DNAPL contaminant of said LNAPL and DNAPL-contaminated groundwater.

6. A method as described in claim 1 wherein said step of assuring a concentration of a specific bacteria in said LNAPL and DNAPL-contaminated groundwater is no less than 100 bacteria per milliliter of said LNAPL and DNAPL-contaminated groundwater comprises the step of assuring a concentration of *Dehalococcoides* bacteria in said LNAPL AND DNAPL-contaminated groundwater is at least 10,000 bacteria per milliliter of said LNAPL and DNAPL contaminated groundwater.

7. A method as described in claim 1 further comprising the step of assuring a concentration of $S^{2-}$ in said LNAPL and DNAPL-contaminated groundwater is less than 2 mM.

8. A method as described in claim 7 further comprising the step of adding ferrous iron or iron chloride to said LNAPL and DNAPL-contaminated groundwater to reduce an $H_2S$ concentration.

9. A method as described in claim 1 wherein said step of assuring a molar ratio of carbon to a specific electron acceptor in said LNAPL and DNAPL-contaminated groundwater is no greater than 20 comprises the step of assuring a molar ratio of carbon to electron acceptor is no greater than 10.

10. A method as described in claim 1 wherein said step of assuring a molar ratio of carbon to a specific electron acceptor in said LNAPL and DNAPL-contaminated groundwater is no greater than 20 comprises the step of assuring a molar ratio of carbon to nitrate is no greater than 2.5.

11. A method as described in claim 10 wherein the step of assuring a molar ratio of carbon to nitrate is no greater than 2.5 comprises the step of adding nitrate to said LNAPL and DNAPL-contaminated groundwater.

12. A method as described in claim 1 wherein said step of assuring a molar ratio of carbon to a specific electron acceptor in said LNAPL and DNAPL-contaminated groundwater is no greater than 20 comprises the step of assuring a molar ratio of carbon to iron is no greater than 0.50.

13. A method as described in claim 12 wherein said step of assuring a molar ratio of carbon to iron is no greater than 0.50 comprises the step of adding iron to said LNAPL and DNAPL-contaminated groundwater.

14. A method as described in claim 1 wherein said step of assuring a molar ratio of carbon to a specific electron acceptor in said LNAPL and DNAPL-contaminated groundwater is no greater than 20 comprises the step of assuring a molar ratio of carbon to sulfur is no greater than 5.

15. A method as described in claim 14 wherein the step of assuring a molar ratio of carbon to sulfur is no greater than 5 comprises the step of adding sulfur to said LNAPL and DNAPL-contaminated groundwater.

16. A method as described in claim 1 wherein said step of assuring a molar ratio of carbon to a specific electron acceptor in said LNAPL and DNAPL-contaminated groundwater is no greater than 20 comprises the step of assuring a molar ratio of carbon to oxygen is no greater than 5.

17. A method as described in claim 16 wherein the step of assuring a molar ratio of carbon to oxygen is no greater than 5 comprises the step of adding oxygen to said LNAPL and DNAPL-contaminated groundwater.

18. A method as described in claim 1 wherein at least one of said steps of assuring comprises the step of adding a substance to said LNAPL and DNAPL-groundwater.

19. A method as described in claim 1 wherein said LNAPL and DNAPL-contaminated groundwater is anaerobic.

20. A method as described in claim 1 wherein said step of assuring a molar ratio of carbon to nutrient nitrogen in LNAPL and DNAPL-contaminated groundwater is no greater than 16 comprises the step of assuring said molar ratio of carbon to nutrient nitrogen is no greater than 8.

21. A method as described in claim 20 wherein said step of assuring said molar ratio of carbon to nutrient nitrogen is no greater than 8 comprises the step of assuring said molar ratio of carbon to nutrient nitrogen is substantially 7.33.

22. A method as described in claim 1 wherein said step of assuring a molar ratio of carbon to nutrient nitrogen in LNAPL and DNAPL-contaminated groundwater is no greater than 16 comprises the step of adding a nitrogen source to said LNAPL and DNAPL-contaminated groundwater.

23. A method as described in claim 22 wherein said nitrogen source is a nitrogen source selected from the group consisting of uric acid, ammonium, poultry manure, and nitrate.

24. A method as described in claim 1 wherein said step of assuring a molar ratio of carbon to a specific electron acceptor in said LNAPL and DNAPL-contaminated groundwater is no greater than 20 comprises the step of adding electron acceptors to said LNAPL and DNAPL-contaminated groundwater.

25. A method as described in claim 24 wherein said specific electron acceptor is an electron acceptor selected from the group consisting of iron, sulfur, oxygen, and nitrate.

26. A method as described in claim 1 wherein said step of assuring a concentration of bacteria in said contaminated groundwater is no less than 100 bacteria per milliliter of said LNAPL and DNAPL-contaminated groundwater comprises the step of adding microbial substrate to said LNAPL and DNAPL-contaminated groundwater.

27. A method as described in claim 26 wherein said step of adding microbial substrate to said LNAPL and DNAPL-contaminated groundwater comprises the step of adding lactate to said LNAPL and DNAPL-contaminated groundwater.

28. A method as described in claim 26 wherein said step of adding microbial substrate to said LNAPL and DNAPL-contaminated groundwater comprises the step of adding milk to said LNAPL and DNAPL-contaminated groundwater.

29. A method as described in claim 1 wherein said step of assuring a concentration of bacteria in said contaminated groundwater is no less than 100 bacteria per milliliter of said LNAPL and DNAPL-contaminated groundwater comprises the step of assuring a concentration of bacteria in said contaminated groundwater is no less than 10,000 bacteria per milliliter of said LNAPL and DNAPL-contaminated groundwater.

30. A method as described in claim 1 further comprising the step of assuring a cis-DCE or VC degradation rate is at least 20% per two month period.

31. A method as described in claim 30 wherein said step of assuring a cis-DCE or VC degradation rate is at least 20% per two month period comprises the step of adding *Dehalococcoides* to said LNAPL and DNAPL-contaminated groundwater.

* * * * *

UNITED STATES PATENT AND TRADEMARK OFFICE
CERTIFICATE OF CORRECTION

| | | |
|---|---|---|
| PATENT NO. | : 7,384,556 B2 | Page 1 of 1 |
| APPLICATION NO. | : 11/489921 | |
| DATED | : June 10, 2008 | |
| INVENTOR(S) | : Song Jin and Paul H. Fallgren | |

It is certified that error appears in the above-identified patent and that said Letters Patent is hereby corrected as shown below:

*The following paragraph should appear at column 1, line 9:*

ACKNOWLEDGMENT OF GOVERNMENT SUPPORT

This patent relates to work performed under U.S. DOE Cooperative Agreement #DE-FC26-98FT40323. The U.S. government may have certain rights in this inventive technology, including "march-in" rights, as provided for by the terms of U.S. DOE Cooperative Agreement #DE-FC26-98FT40323.

Signed and Sealed this

Thirteenth Day of July, 2010

David J. Kappos
*Director of the United States Patent and Trademark Office*